United States Patent
Hammer et al.

(10) Patent No.: US 11,753,053 B2
(45) Date of Patent: Sep. 12, 2023

(54) METHOD FOR OPERATING A RAIL VEHICLE NETWORK

(71) Applicant: SIEMENS MOBILITY GMBH, Munich (DE)

(72) Inventors: Walter Hammer, Mannheim (DE); Christian Stroessner, Grossenseebach (DE)

(73) Assignee: Siemens Mobility GmbH, Munich (DE)

( * ) Notice: Subject to any disclaimer, the term of this patent is extended or adjusted under 35 U.S.C. 154(b) by 610 days.

(21) Appl. No.: 16/643,662

(22) PCT Filed: Aug. 13, 2018

(86) PCT No.: PCT/EP2018/071871
§ 371 (c)(1),
(2) Date: Mar. 2, 2020

(87) PCT Pub. No.: WO2019/042752
PCT Pub. Date: Mar. 7, 2019

(65) Prior Publication Data
US 2020/0269890 A1     Aug. 27, 2020

(30) Foreign Application Priority Data
Sep. 1, 2017   (DE) .............. 10 2017 215 346.6

(51) Int. Cl.
*B61L 25/02*   (2006.01)
*B61L 15/00*   (2006.01)
(Continued)

(52) U.S. Cl.
CPC ........ *B61L 25/025* (2013.01); *B61L 25/021* (2013.01); *B60L 2200/26* (2013.01);
(Continued)

(58) Field of Classification Search
CPC .... B61L 15/0027; B61L 27/40; B61L 25/025; B61L 25/021; B61L 2205/04; B61L 27/20; B60L 2200/26
See application file for complete search history.

(56) References Cited

U.S. PATENT DOCUMENTS

2002/0091483 A1* 7/2002 Douet ............... B61L 23/34
701/408
2005/0251337 A1* 11/2005 Rajaram ............ B61L 29/28
701/19
(Continued)

FOREIGN PATENT DOCUMENTS

CN   101590864 A   12/2009
CN   106985880 A   7/2017
(Continued)

OTHER PUBLICATIONS

Machine Translation of Ho's reference (KR 10-0977727 B1) (Year: 2010).*
(Continued)

*Primary Examiner* — Tarek Elarabi
(74) *Attorney, Agent, or Firm* — Laurence A. Greenberg; Werner H. Stemer; Ralph E. Locher

(57) ABSTRACT

A method for operating a rail vehicle network, in which a plurality of rail vehicles travel. The rail vehicles determine their respective position in the rail vehicle network by forming position information. Each of the rail vehicles transmits its position information to a route-side central unit, and the central unit forwards the received position information to all rail vehicles in the rail vehicle network. The rail vehicles each have their own collision monitoring unit, which checks the received position information for a possible risk of a collision with one or more of the other rail
(Continued)

vehicles, and generates a collision warning signal in the event that a collision risk is established.

11 Claims, 3 Drawing Sheets

(51) Int. Cl.
  *B61L 27/20*  (2022.01)
  *B61L 27/40*  (2022.01)
(52) U.S. Cl.
  CPC ........... *B61L 15/0027* (2013.01); *B61L 27/20* (2022.01); *B61L 27/40* (2022.01); *B61L 2205/04* (2013.01)

(56) References Cited

U.S. PATENT DOCUMENTS

| | | |
|---|---|---|
| 2010/0327125 A1 | 12/2010 | Braband et al. |
| 2013/0138314 A1* | 5/2013 | Viittala ................. G01S 5/0263 342/146 |
| 2016/0159381 A1* | 6/2016 | Fahmy ..................... B61K 9/10 701/19 |
| 2018/0105190 A1* | 4/2018 | Becke ..................... G08G 1/162 |
| 2020/0269890 A1 | 8/2020 | Hammer et al. |

FOREIGN PATENT DOCUMENTS

| | | |
|---|---|---|
| DE | 4434789 A1 | 4/1996 |
| DE | 102008012416 A1 | 9/2009 |
| DE | 102009049081 A1 | 4/2011 |
| EP | 0704366 A1 | 4/1996 |
| KR | 10-0977727 B1 * | 8/2010 |
| WO | 2019042752 A1 | 3/2019 |

OTHER PUBLICATIONS

Machine Translation of Huang's reference (CN 101590864 B) (Year: 2012).*
Machine Translation of Zwingel's reference (DE 4434789 A1) (Year: 1996).*
Wikipedia, GSM-R, 2016, https://web.archive.org/web/20160505063152/https://en.wikipedia.org/wiki/GSM-R (Year: 2016).*

* cited by examiner

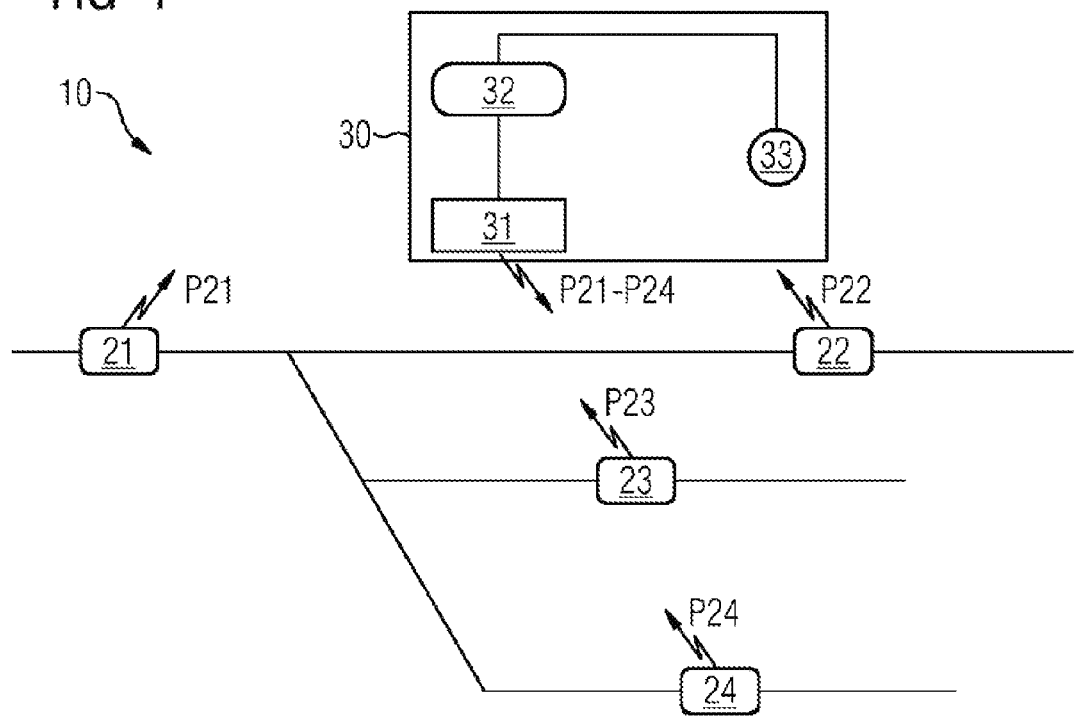
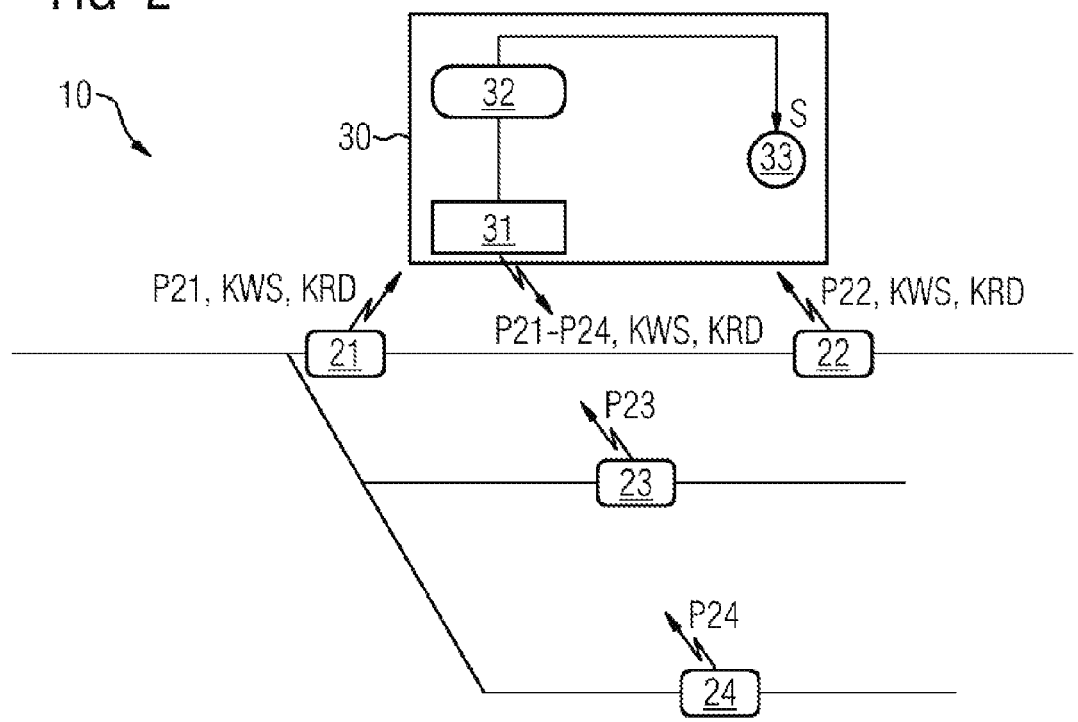

METHOD FOR OPERATING A RAIL VEHICLE NETWORK

BACKGROUND OF THE INVENTION

Field of the Invention

The invention relates to a method for operating a rail vehicle network, to a rail vehicle that is able to be operated in accordance with the method, to a stationary central apparatus for the method and to a railway installation that is able to be operated in accordance with the method.

At the present time, collisions in track-bound rail traffic are avoided through the attention of the drive vehicle driver and, in defined track sections, through the use of train safety systems. Train safety systems however always require track-side equipment, which leads to high investment costs.

The invention is based on the object of making it possible to operate a rail vehicle network with investment costs that are as low as possible but still with high safety, in particular on single-line track sections.

This object is achieved according to the invention by a method as claimed. Advantageous refinements of the method according to the invention are defined in the dependent claims.

SUMMARY OF THE INVENTION

The invention accordingly makes provision that each of the rail vehicles transmits its position information to a track-side central apparatus, the central apparatus forwards the received position information to all of the rail vehicles in the rail vehicle network and the rail vehicles each have a rail vehicle-specific collision monitoring apparatus that checks the received position information with regard to a potential collision risk of a collision with one or more of the other rail vehicles and generates a collision warning signal in the event of an established collision risk.

One key advantage of the method according to the invention is that collision monitoring takes place on the side of the rail vehicle, specifically by way of the rail vehicle-specific collision monitoring apparatus provided according to the invention. On the track side, it is necessary to provide only a central apparatus that forwards the position information to the rail vehicles.

It is advantageous if each of the rail vehicles transmits its position information to the central apparatus by way of a mobile radio apparatus. Suitable mobile radio apparatuses are conventional in rail vehicles, such that it is possible to transmit and receive position information without additional hardware.

With regard to GSM-R mobile radio that is conventional in railway technology, it is considered to be advantageous that each of the rail vehicles transmits its position information to the central apparatus by way of a GSM-R mobile radio apparatus.

With regard to simple and inexpensive positioning, it is considered to be advantageous if each of the rail vehicles is equipped with a dedicated satellite-assisted positioning apparatus and determines its position information on the basis of the positioning data of the positioning apparatus or forwards the positioning data of the positioning apparatus to the central apparatus as its position information.

The satellite-assisted positioning apparatuses are preferably GPS or Galileo positioning apparatuses.

It is also advantageous if the rail vehicles transmit the collision warning signal and/or collision risk data to the central apparatus in the event of an established collision risk. The central apparatus preferably forwards received collision warning signals and/or collision risk data to all of the rail vehicles or at least the rail vehicles concerned by the collision risk. The collision risk data preferably specify the rail vehicles concerned by the upcoming or potential collision.

With regard to determining a collision risk with particularly little effort and quickly, it is considered to be advantageous if each of the rail vehicles, in addition to the position information, transmits speed information that specifies the respective speed of the rail vehicle to the track-side central apparatus, the central apparatus forwards the received position and speed information to all of the rail vehicles in the rail vehicle network and the collision monitoring apparatuses of the rail vehicles take the received position and speed information into consideration when determining the collision risk, generating the collision warning signal and/or generating the collision risk data.

It is also advantageous if the central apparatus checks the received position information with a central apparatus-side collision monitoring apparatus with regard to a potential collision risk and sends a central apparatus-side collision warning signal to all concerned rail vehicles in the event of an established collision risk.

The rail vehicles are preferably each equipped with an optical and/or acoustic warning apparatus in the driver's cabin or in the driver's cabins, which warning apparatus is activated in the presence of a collision warning signal generated by the rail vehicle-specific collision monitoring apparatus or upon receiving a central apparatus-side collision warning signal.

A brake activation apparatus of the rail vehicles will preferably trigger automatic braking of the rail vehicle in the presence of a collision warning signal generated by the rail vehicle-specific collision monitoring apparatus or upon receiving a central apparatus-side collision warning signal.

The central apparatus is preferably equipped with an optical and/or acoustic warning apparatus that is activated upon receiving a collision warning signal received from one of the rail vehicle-specific collision monitoring apparatuses or in the presence of a central apparatus-side collision warning signal.

The invention furthermore relates to a rail vehicle having a positioning apparatus for determining the respective position of the rail vehicle in the rail vehicle network and for creating position information. According to the invention, there are provided:

a mobile radio apparatus for transmitting the position information to a track-side central apparatus and for receiving position information that has been determined by other rail vehicles and been transmitted to the central apparatus and is forwarded from the central apparatus to the mobile radio apparatus of the rail vehicle, and a collision monitoring apparatus that in each case checks the received position information of the other rail vehicles with regard to a potential collision risk of a collision with one or more of the other rail vehicles and generates a collision warning signal in the event of an established collision risk.

The invention furthermore relates to a stationary central apparatus that is characterized by a mobile radio apparatus and a central apparatus-side information distribution apparatus that is connected to the mobile radio apparatus and is designed such that it receives position information determined on the rail vehicle side using the mobile radio apparatus and forwards received rail vehicle-side position information to all of the rail vehicles.

The invention furthermore relates to a railway installation having a stationary central apparatus as described above and at least two rail vehicles as described above.

The invention is explained in more detail below with reference to exemplary embodiments.

BRIEF DESCRIPTION OF THE SEVERAL VIEWS OF THE DRAWING

FIG. 1 shows an exemplary embodiment of a railway installation according to the invention in which rail vehicles transmit their position information to a central apparatus.

FIG. 2 shows the railway installation at a later time at which two rail vehicles have already dangerously moved toward one another.

DETAILED DESCRIPTION OF THE INVENTION

Figure 3:
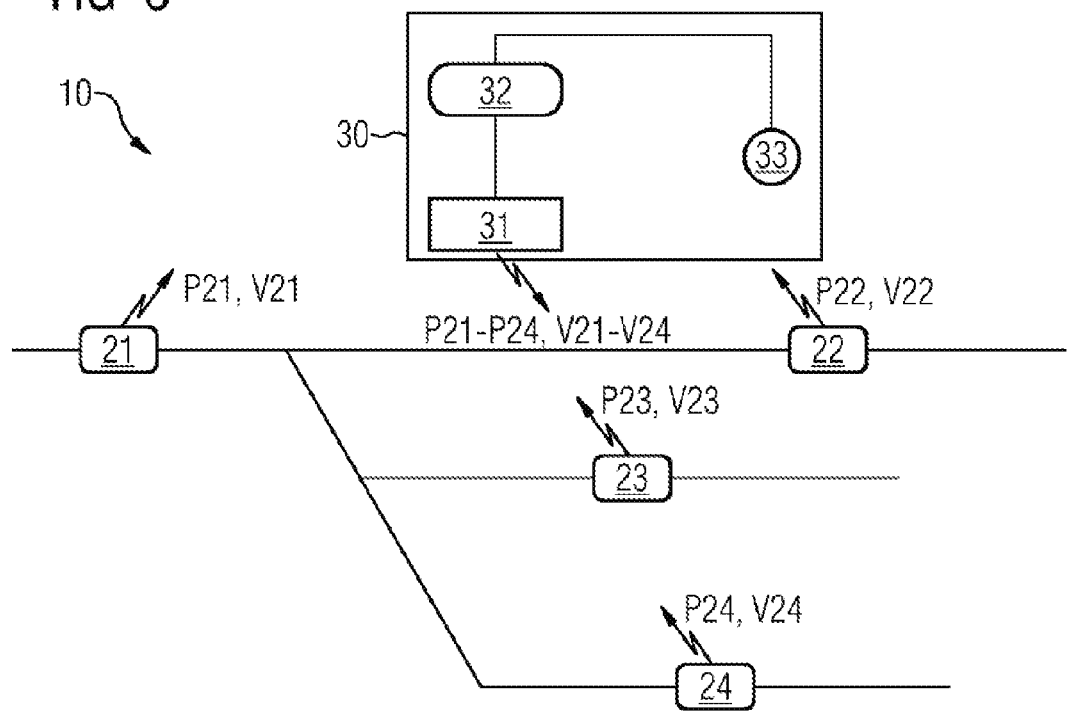
FIG. 3 shows an exemplary embodiment of a railway installation in which rail vehicles, in addition to position information, transmit speed information to the central apparatus.

The same reference signs are always used for identical or comparable components in the figures for the sake of clarity.

FIG. 1 shows a rail vehicle network in the form of a railway installation 10 that is traveled on by four rail vehicles 21, 22, 23 and 24. The rail vehicles 21, 22, 23 and 24 are connected to a central apparatus 30 and transmit thereto position information P21, P22, P23 and P24 that specifies the respective position of the rail vehicle on the railway installation 10. The position information P21, P22, P23 and P24 is transmitted via radio, preferably via GSM-R mobile radio apparatuses.

The central apparatus 30 receives the position information P21 to P24 and forwards it to all of the rail vehicles 21, 22, 23 and 24 via radio, preferably likewise via GSM-R mobile radio. This forwarding of the position information allows each rail vehicle in each case to determine itself the risk of a collision with one or more other rail vehicles. If a rail vehicle establishes a collision risk, then it generates a collision warning signal.

In the illustration according to FIG. 1, it is assumed by way of example that the rail vehicles 21, 22, 23 and 24 have not established any collision risk after checking the position information.

FIG. 1 furthermore shows an exemplary embodiment of the structure of the central apparatus 30 in more detail. The central apparatus 30 comprises a mobile radio apparatus 31 for receiving the position information P21 to P24 sent by the rail vehicles 21 to 24. The mobile radio apparatus 31 forwards the received position information P21 to P24 to an information distribution apparatus 32. The information distribution apparatus 32 actuates the mobile radio apparatus 31 such that it sends the received position information P21 to P24, preferably in bundled form, back to the rail vehicles 21 to 24, such that all of the rail vehicles 21 to 24 in each case always receive all position information P21 to P24 and thus identify the position of all of the other rail vehicles.

The central apparatus 30 furthermore preferably has an acoustic and/or optical warning apparatus 33 that is connected to the information distribution apparatus 32. If the mobile radio apparatus 31 and the information distribution apparatus 32 receive a collision warning signal or collision risk data from one or more of the rail vehicles traveling on the railway installation 10, then the information distribution apparatus 32 preferably generates an activation signal S in order to activate the warning apparatus 33.

FIG. 2 shows the railway installation 10 according to FIG. 1 at a later time. It is able to be seen that the rail vehicles 21 and 22 have already moved considerably closer to one another because they are traveling toward one another. The rail vehicles 21 and 22 will accordingly establish a collision risk and generate a corresponding collision warning signal KWS.

In the event of an established collision risk, the rail vehicles 21 and 22 will transmit the collision warning signal KWS and/or collision risk data KRD that describe the collision risk in more detail and in particular identify the rail vehicles involved to the central apparatus 30 via radio. The central apparatus 30, in addition to the position information P21 to P24, forwards the received collision warning signals KWS and/or collision risk data KRD to all of the rail vehicles on the railway installation 10 or else at least to the rail vehicles concerned, that is to say in this case the rail vehicles 21 and 22.

Rail vehicles that have established a collision risk relating to themselves and/or have received collision warning signals that are relevant to them and/or collision risk data from other rail vehicles via the central apparatus 30 will adapt their driving behavior, in particular significantly reduce their speed or stop in order to avoid a collision with another rail vehicle. In the exemplary embodiment according to FIG. 2, the rail vehicles 21 and 22 thus preferably travel onward only at a minimum speed or stop.

FIG. 3 shows an exemplary embodiment of a railway installation 10 in which the rail vehicles 21, 22, 23 and 24, in addition to position information P21 to P24, transmit speed information V21 to V24 to the central apparatus 30. The central apparatus 30 forwards the received position information P21 to P24 and the received speed information V21 to V24 to all of the rail vehicles 21 to 24.

The rail vehicles 21 to 24 thus have the option, when determining or establishing the collision risk, of also taking into account, in addition to the position information P21 to P24, the respective speed information V21 to V24.

For the rest, the above explanations in connection with FIGS. 1 and 2 apply accordingly to the exemplary embodiment according to FIG. 3.

Figure 4:
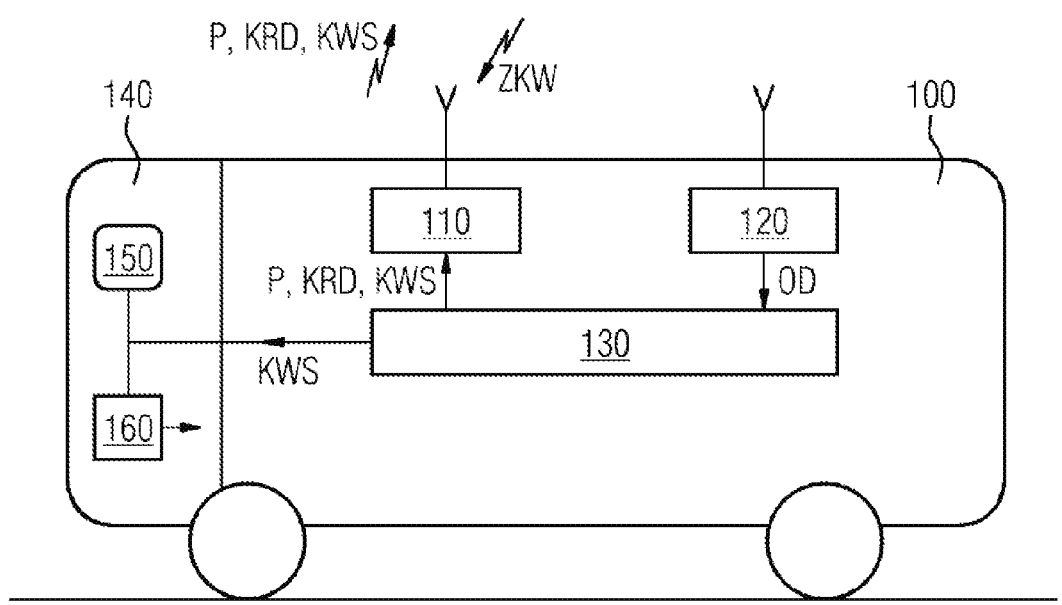
FIG. 4 shows an exemplary embodiment of a rail vehicle that is able to be operated on the railway installation according to FIGS. 1 and 2.

FIG. 4 shows an exemplary embodiment of a rail vehicle 100 that is able to be used in the railway installation 10 according to FIGS. 1 and 2 as any of the rail vehicles 21 to 24. The rail vehicle 100 has a mobile radio apparatus 110, a satellite-assisted positioning apparatus 120 and a collision monitoring apparatus 130.

The collision monitoring apparatus 130 forwards the positioning data OD of the positioning apparatus 120, in unprocessed or processed form, as position information P, to the central apparatus 30 shown in FIGS. 1 and 2 by way of the mobile radio apparatus 110.

The collision monitoring apparatus 130 furthermore evaluates the position information, forwarded from the central apparatus 30, of the other rail vehicles traveling on the railway installation 10 according to FIGS. 1 and 2. If the collision monitoring apparatus 130 establishes a collision risk on the basis of the received position information, then it generates a collision warning signal KWS and collision risk data KRD that describe the collision risk and in particular identify the rail vehicles involved. The collision warning signal KWS and/or the collision risk data KRD are sent to the central apparatus 30.

The collision warning signal KWS may be used to activate a warning apparatus 150 and/or a brake activation apparatus 160 located in a driver's cabin 140 of the rail vehicle 100. The brake activation apparatus 160 triggers automatic braking of the rail vehicle 100 in the event that the collision warning signal KWS is present.

The collision monitoring apparatus 130 may furthermore receive a central apparatus-side collision warning signal ZKW via the mobile radio apparatus 110 if this is sent by the central apparatus 30. In the event of receiving a central apparatus-side collision warning signal ZKW, the warning apparatus 150 and the brake activation apparatus 160 are preferably activated.

Figure 5:
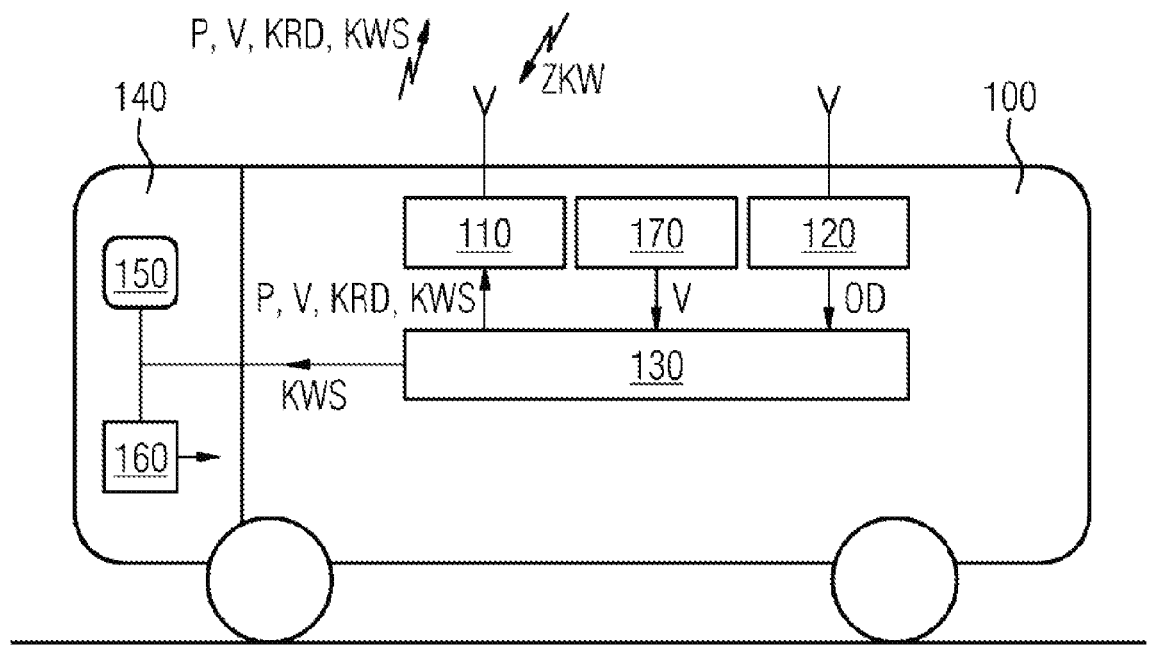
FIG. 5 shows an exemplary embodiment of a rail vehicle that is able to be operated on the railway installation according to FIG. 3.

If the rail vehicle 100 is intended to be used in the railway installation 10 according to FIG. 3, then it will additionally transmit speed information V that specifies the respective speed to the central apparatus 30. FIG. 5 shows such a variant embodiment of the rail vehicle 100. The speed information V may be created from the position information P of the positioning apparatus 120 through time derivation or be measured by way of a separate speed measurement apparatus 170.

Figure 6:
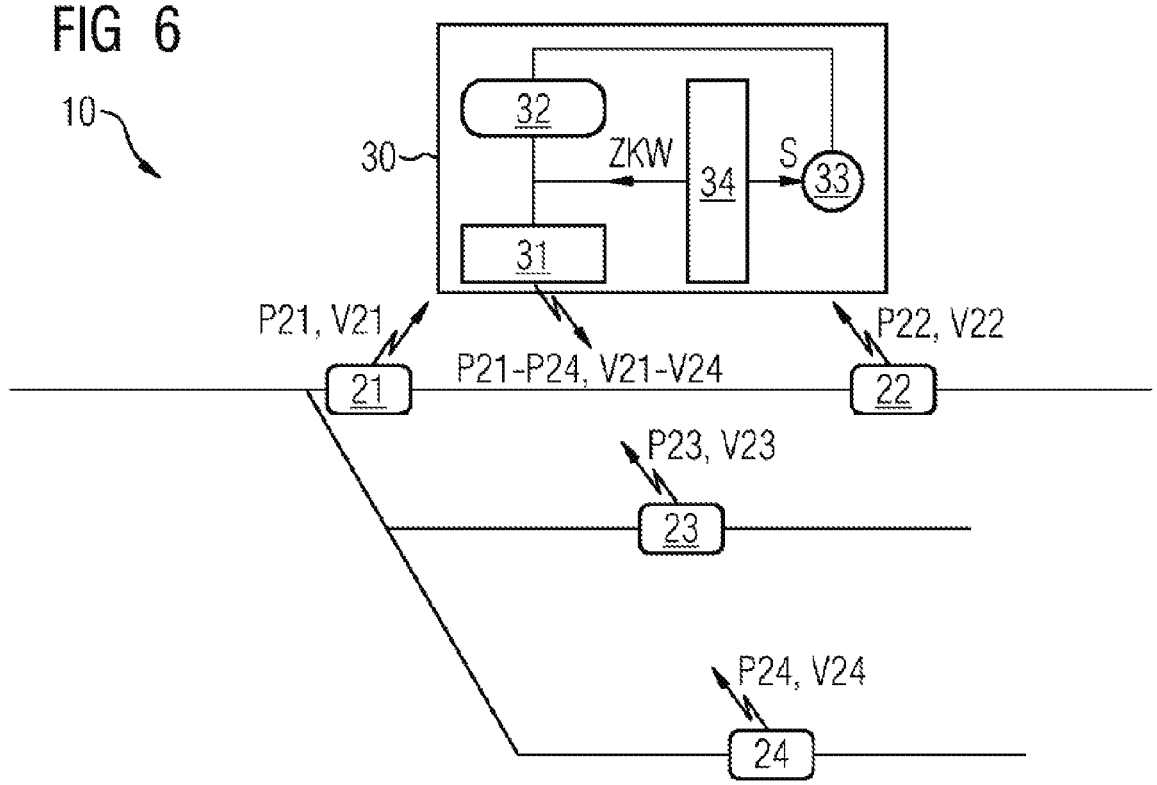
FIG. 6 shows an exemplary embodiment of a railway installation in which a central apparatus has a dedicated collision monitoring apparatus.

FIG. 6 shows an exemplary embodiment of a railway installation 10 in which the central apparatus 30 is equipped with a central apparatus-side collision monitoring apparatus 34. The collision monitoring apparatus 34 evaluates the incoming position information P21 to P24 and incoming speed information V21 to V24—if this is transmitted—and potentially establishes a collision risk between rail vehicles. If such a collision risk exists, then it generates a central apparatus-side collision warning signal ZKW that is transmitted to the rail vehicles concerned by the collision, for example the rail vehicles 21 and 22, or to all of the rail vehicles 21 to 24.

In the event that the central apparatus-side collision warning signal ZKW is present, the warning apparatus 33 of the central apparatus 30 is preferably also activated by way of the control signal S.

For the rest, the above explanations in connection with FIGS. 1 to 5 apply accordingly.

Although the invention has been described and illustrated in more detail through preferred exemplary embodiments, the invention is not restricted by the disclosed examples and other variations may be derived therefrom by a person skilled in the art without departing from the scope of protection of the invention.

The invention claimed is:

1. A method for operating a rail vehicle network in which a multiplicity of rail vehicles are traveling, the method comprising:
   determining with each of the rail vehicles a respective position in the rail vehicle network by creating position information;
   transmitting the position information from each of the rail vehicles to a track-side central apparatus;
   forwarding the position information from the central apparatus to all of the rail vehicles in the rail vehicle network; and
   checking with a rail vehicle-specific collision monitoring apparatus provided in each rail vehicle the position information with regard to a potential collision risk of a collision with one or more other rail vehicles and, when a collision risk is established, generating a collision warning signal;
   when the collision risk is established, transmitting the collision warning signal from the respective rail vehicle to the central apparatus;
   forwarding the collision warning signal from the central apparatus to at least the rail vehicles concerned by the collision risk; and
   sending the collision warning signal within each rail vehicle from the rail vehicle-specific collision monitoring apparatus of the rail vehicle to a brake activation apparatus of the rail vehicle to activate automatic braking of the rail vehicle when the collision risk is established.

2. The method according to claim 1, wherein each of the rail vehicles is equipped with a mobile radio apparatus and each of the rail vehicles transmits its position information to the central apparatus by way of the mobile radio apparatus.

3. The method according to claim 1, wherein each of the rail vehicles is equipped with a GSM-R mobile radio apparatus and each of the rail vehicles transmits its position information to the central apparatus by way of the GSM-R mobile radio apparatus.

4. The method according to claim 1, wherein each of the rail vehicles is equipped with a dedicated satellite-assisted positioning apparatus and each of the rail vehicles determines its position information on a basis of the positioning data of the positioning apparatus or forwards the positioning data of the positioning apparatus to the central apparatus as its position information.

5. The method according to claim 4, wherein the satellite-assisted positioning apparatus is a GPS or a Galileo positioning apparatus.

6. The method according to claim 1, wherein:
   the rail vehicles transmit collision risk data to the central apparatus in the event of an established collision risk; and
   the central apparatus forwards the collision risk data so received to at least those rail vehicles that are concerned by the collision risk.

7. The method according to claim 6, which comprises:
   transmitting from each of the rail vehicles, in addition to the position information, speed information that specifies a respective speed of the rail vehicle to the track-side central apparatus;
   forwarding from the central apparatus the position and speed information so received to all of the rail vehicles in the rail vehicle network; and
   causing the collision monitoring apparatuses of the rail vehicles to take the received position and speed information into consideration when determining the collision risk, when generating the collision warning signal, and/or when generating the collision risk data.

8. The method according to claim 1, which comprises checking the received position information with a central apparatus-side collision monitoring apparatus with regard to a potential collision risk and sending a central apparatus-side collision warning signal to all concerned rail vehicles when a collision risk is established.

9. The method according to claim 8, wherein the rail vehicles are each equipped with an optical and/or acoustic warning apparatus in a driver's cabin or in the driver's cabins, and the method further comprises activating the warning apparatus by sending the collision warning signal within the rail vehicle to the warning apparatus when the collision warning signal is generated by the rail vehicle-specific collision monitoring apparatus.

10. The method according to claim 9, which comprises additionally triggering automatic braking and the acoustic warning apparatus upon receiving a collision warning signal from the central apparatus.

11. The method according to claim 1, wherein the central apparatus is equipped with an optical and/or acoustic warning apparatus that is activated upon receiving the collision warning signal from one of the rail vehicle-specific collision monitoring apparatuses or when a collision warning signal is present at the central apparatus.

* * * * *